United States Patent
Butcher et al.

(10) Patent No.: US 9,931,776 B2
(45) Date of Patent: Apr. 3, 2018

(54) METHODS FOR MANUFACTURING FIBER-REINFORCED POLYMERIC COMPONENTS

(71) Applicant: United Technologies Corporation, Hartford, CT (US)

(72) Inventors: Evan Butcher, Windsor Locks, CT (US); Wendell Twelves, Glastonbury, CT (US); Gary Schirtzinger, Glastonbury, CT (US); Joe Ott, Enfield, CT (US); Lyutsia Dautova, Rocky Hill, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 662 days.

(21) Appl. No.: 14/559,012

(22) Filed: Dec. 3, 2014

(65) Prior Publication Data

US 2015/0165666 A1 Jun. 18, 2015

Related U.S. Application Data

(60) Provisional application No. 61/915,277, filed on Dec. 12, 2013.

(51) Int. Cl.
| | | |
|---|---|---|
| *B29C 47/00* | (2006.01) | |
| *B29C 64/118* | (2017.01) | |
| *B29C 64/165* | (2017.01) | |
| *B29C 69/00* | (2006.01) | |
| *B29C 65/00* | (2006.01) | |

(Continued)

(52) U.S. Cl.
CPC ...... *B29C 47/0014* (2013.01); *B29C 47/0066* (2013.01); *B29C 64/118* (2017.08); *B29C 64/165* (2017.08); *B29C 66/69* (2013.01); *B29C 67/0055* (2013.01); *B29C 67/0085* (2013.01); *B29C 69/001* (2013.01); *B33Y 10/00* (2014.12); *B33Y 30/00* (2014.12); *D02G 3/22* (2013.01); *B29C 47/025* (2013.01); *B29C 47/0866* (2013.01); *B29C 47/1045* (2013.01); *B29C 47/1054* (2013.01); *B29K 2055/02* (2013.01); *B29K 2071/00* (2013.01); *B29K 2105/10* (2013.01); *B29L 2031/707* (2013.01); *Y10T 428/2929* (2015.01)

(58) Field of Classification Search
CPC ............. B29C 47/0066; B29C 47/025; B29C 47/1054; B29C 64/118; B29C 64/165; B29C 66/69; B29C 67/0055; B29C 67/0081; B29C 69/001
USPC ............. 264/135, 136, 148, 171.13, 171.23, 264/172.11, 172.14, 172.15, 255, 308; 156/166, 167, 180
See application file for complete search history.

(56) References Cited

U.S. PATENT DOCUMENTS

2011/0076495 A1* 3/2011 Batchelder .......... B29C 47/0038
428/369
2013/0327917 A1* 12/2013 Steiner ................... F16M 11/12
248/649

(Continued)

*Primary Examiner* — Leo B Tentoni
(74) *Attorney, Agent, or Firm* — Snell & Wilmer, L.L.P.

(57) ABSTRACT

Components may be manufactured by co-extruding a polymer filament and a fiber filament from a nozzle. The polymer filament and the fiber filament may be heated within the nozzle, which may couple the polymer filament to the fiber filament. The co-extruded filament may result in long reinforcing fibers which provide strength to the components.

10 Claims, 5 Drawing Sheets

(51) Int. Cl.
    *D02G 3/22*     (2006.01)
    *B29C 67/00*    (2017.01)
    *B33Y 10/00*    (2015.01)
    *B33Y 30/00*    (2015.01)
    B29K 71/00      (2006.01)
    B29K 55/02      (2006.01)
    B29L 31/00      (2006.01)
    B29K 105/10     (2006.01)
    B29C 47/02      (2006.01)
    B29C 47/08      (2006.01)
    B29C 47/10      (2006.01)

(56) References Cited

U.S. PATENT DOCUMENTS

2014/0232035 A1*  8/2014  Bheda .................. B29C 67/0055
                                                       264/148
2015/0048553 A1*  2/2015  Dietrich ................ B22F 3/1055
                                                       264/401

* cited by examiner

METHODS FOR MANUFACTURING FIBER-REINFORCED POLYMERIC COMPONENTS

CROSS-REFERENCE TO RELATED APPLICATIONS

This application is a nonprovisional of, and claims priority to, and the benefit of U.S. Provisional Application No. 61/915,277, entitled "SYSTEMS AND METHODS FOR MANUFACTURING FIBER-REINFORCED POLYMERIC COMPONENTS," filed on Dec. 12, 2013, which is hereby incorporated by reference in its entirety.

FIELD

The present disclosure relates generally to the manufacture of polymeric components. More particularly, the present disclosure relates to the manufacture of fiber-reinforced polymeric components.

BACKGROUND

Fused filament fabrication is a three-dimensional printing process commonly used for modeling, prototyping, and production applications. A plastic filament may be unwound from a coil and supply material to produce a component. The plastic filament may be heated past its glass transition temperature and then deposited by a nozzle. The component may be built layer by layer from the bottom up. For example, the component may be produced by extruding thermoplastic material to form a layer as the previously deposited layer hardens after extrusion from the nozzle.

SUMMARY

A method of manufacturing a component may comprise feeding a polymer filament into a nozzle and feeding a fiber filament into the nozzle. The polymer filament and the fiber filament may be heated. The heating may couple the polymer filament to the fiber filament. The polymer filament and the fiber filament may be co-extruded from the nozzle.

A system may comprise a polymer filament feed reel, a fiber filament feed reel, a nozzle comprising a heating element, and a feeder wheel. The feeder wheel may be configured to drive a polymer filament from the polymer filament feed reel and a fiber filament from the fiber filament feed reel into the nozzle.

A component may comprise a first layer comprising a first co-extruded filament, and a second layer comprising a second co-extruded filament. The first co-extruded filament may comprise a polymer filament and a fiber filament.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
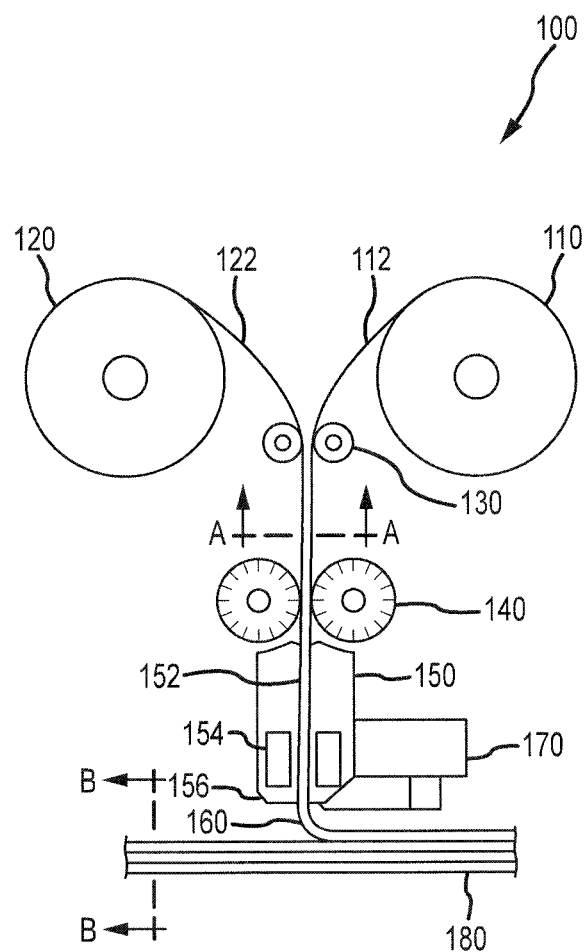
FIG. 1 illustrates a schematic view of a deposition system for forming fiber-reinforced polymeric components in accordance with various embodiments.

Referring to FIG. 1, a deposition system 100 for forming fiber-reinforced polymeric components is illustrated according to various embodiments. In various embodiments, deposition system 100 may comprise a polymer filament feed reel 110, a fiber filament feed reel 120, guide rollers 130, feeder wheels 140, nozzle 150, and cutter 170.

Fiber filament feed reel 120 may store a length of reinforcing fiber filament 122. Fiber filament 122 may be wound around fiber filament feed reel 120 similarly to a spool of thread. Various types of reinforcing fibers may be utilized with deposition system 100. For example, in various embodiments, fiber filament 122 may comprise glass (e.g. E-glass, S-glass), carbon, basalt, aramid, or any other suitable material.

Polymer filament feed reel 110 may store a length of polymer filament 112. Polymer filament 112 may be wound around polymer filament feed reel 110 similarly to a spool of thread. Various types of polymer filaments may be utilized with deposition system 100. For example, in various embodiments, polymer filament 112 may comprise high temperature polymers such as a polyether ether ketone (PEEK) or an amorphous thermoplastic polyetherimide (PEI), such as ULTEM®, which is a trademark of SABIC Innovative Plastics, Inc. However, in various embodiments, for lower temperature applications, materials having a lower melting temperature such as nylon, acrylonitrile butadiene styrene ("ABS"), polypropylene, and polyethylene may be used. Polymer filament 112 may comprise, for example, a thermoplastic material.

Deposition system 100 may further comprise guide rollers 130. Fiber filament 122 and polymer filament 112 may be fed between guide rollers 130. Guide rollers 130 may be positioned such that fiber filament 122 and polymer filament 112 exit guide rollers 130 adjacent to one another.

Deposition system 100 may further comprise feeder wheels 140. Feeder wheels 140 may grip fiber filament 122 and polymer filament 112. In various embodiments, feeder wheels 140 may be driven by a motor which causes feeder wheels to rotate. Feeder wheels 140 may pull fiber filament 122 and polymer filament 112 through guide rollers 130, causing polymer filament feed reel 110 to rotate in a counter-clockwise direction such that polymer filament 112 unwinds from polymer filament feed reel 110, and causing fiber filament feed reel 120 to rotate in a clockwise direction such that fiber filament 122 unwinds from fiber filament feed reel 120.

In various embodiments, feeder wheels 140 may direct polymer filament 112 and fiber filament 122 into nozzle 150. Nozzle 150 may comprise a channel 152 and heating elements 154. Feeder wheels 140 may drive polymer filament 112 and fiber filament 122 through channel 152. Heating elements 154 may comprise any type of component configured to heat polymer filament 112. For example, in various embodiments heating elements 154 may comprise a nichrome wire which converts electric current into heat.

In various embodiments, as polymer filament 112 and fiber filament 122 pass by heating elements 154, heat from heating elements 154 may at least partially melt polymer filament 112. Adhesion between polymer filament 112 and fiber filament 122, as well as cohesion within polymer filament 112 may cause polymer filament 112 to encapsulate and/or at least partially encapsulate fiber filament 122. Fiber filament 122 may therefore be located within polymer filament 112 as fiber filament 122 and polymer filament 112 exit nozzle 150 as a co-extruded filament 160 at deposition head 156. However, in various embodiments, fiber filament 122 may not be fully encapsulated within polymer filament 112, but fiber filament 122 may adhere to polymer filament 112 during the heating process to create co-extruded filament 160.

Deposition system 100 may further comprise a cutter 170. Cutter 170 may be configured to cut co-extruded filament 160 at deposition head 156. Cutter 170 is further discussed with reference to FIG. 3.

In various embodiments, deposition system 100 may deposit co-extruded filament 160 within a mold. In various embodiments, nozzle 150 may move relative to the mold in order to deposit co-extruded filament 160 throughout the mold. However, in various embodiments, the mold may be moved relative to deposition system 100. In various embodiments, a mold may not be utilized, and as co-extruded filament 160 is deposited, co-extruded filament may harden and multiple layers of co-extruded filament 160 may be stacked upon one another creating a free form grown component.

A shape of a component 180 to be created by deposition system 100 may be controlled by a designated by a controller in communication with a non-transitory, tangible memory. The memory may contain instructions which direct the position of nozzle 150. In various embodiments, servo motors may move nozzle 150 in three dimensions along a path designated by the memory.

Many different types of components may be manufactured using the methods described herein. In various embodiments, gas turbine engine aircraft components such as brackets, harness clips, inspection ports, hatch covers, etc., may be manufactured using the described methods. In various embodiments, components may include an engine component, automotive component, sporting good component, consumer product component, tooling component, and assembly aid. The co-extruded materials of components made by the methods described herein may allow for relatively lighter weight plastic components to replace components typically made of heavier materials, such as steel or aluminum. The fiber filaments may provide added strength to the components, even at relatively high temperatures, which can increase the strength of the polymer to be sufficient to replace heavier materials.

Figure 2A:
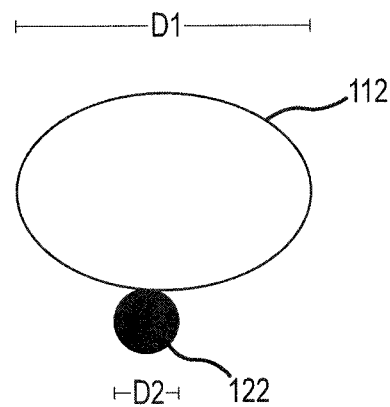
FIG. 2A illustrates a cross-section view of a polymer filament and a fiber filament in accordance with various embodiments.

Referring to FIG. 2A, a cross-section of polymer filament 112 and fiber filament 122 at section A-A in FIG. 1 prior to entering nozzle 150 is illustrated according to various embodiments. Prior to entering nozzle 150, polymer filament 112 and fiber filament 122 may be adjacent to one another. In various embodiments, polymer filament 112 may comprise a diameter D1 greater than a diameter D2 of fiber filament 122. In various embodiments, diameter D1 of polymer filament 112 may be between about 0.005 inches-0.040 inches (0.013 cm-0.102 cm. In various embodiments, diameter D2 of fiber filament 122 may be between about 0.0002 inches-0.010 inches (0.0005 cm-0.025 cm).

Figure 2B:
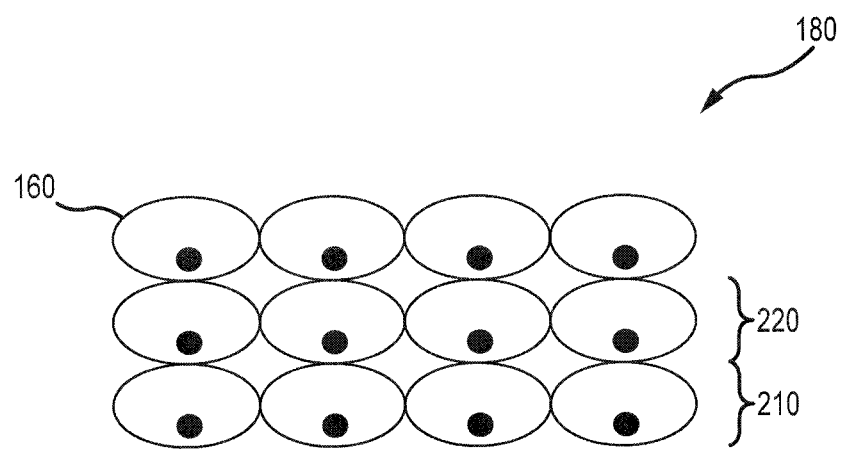
FIG. 2B illustrates a cross-section view of a component in accordance with various embodiments.

Referring to FIG. 2B, a cross-section of component 180 at section B-B in FIG. 1 is illustrated according to various embodiments. In FIG. 2B a plurality of slices of co-extruded filament 160 are visible. In each slice, fiber filament 122 may be located within polymer filament 112 due to the heating of polymer filament 112 as previously described with reference to FIG. 1.

In various embodiments, component 180 may comprise a single continuous length of co-extruded filament 160 which constitutes the entire volume of component 180. However, in various embodiments, component 180 may comprise multiple discrete sections of co-extruded filament 160. For example, in various embodiments, a first section of co-extruded filament 160 may be used to complete a first layer 210 of component 180. Deposition system 100 may cut co-extruded filament 160 and begin second layer 220 of component 180 with a new section of co-extruded filament 160. In various embodiments, co-extruded filament may be cut any number of times in order to match any geometric shape for component 180.

Figure 3:
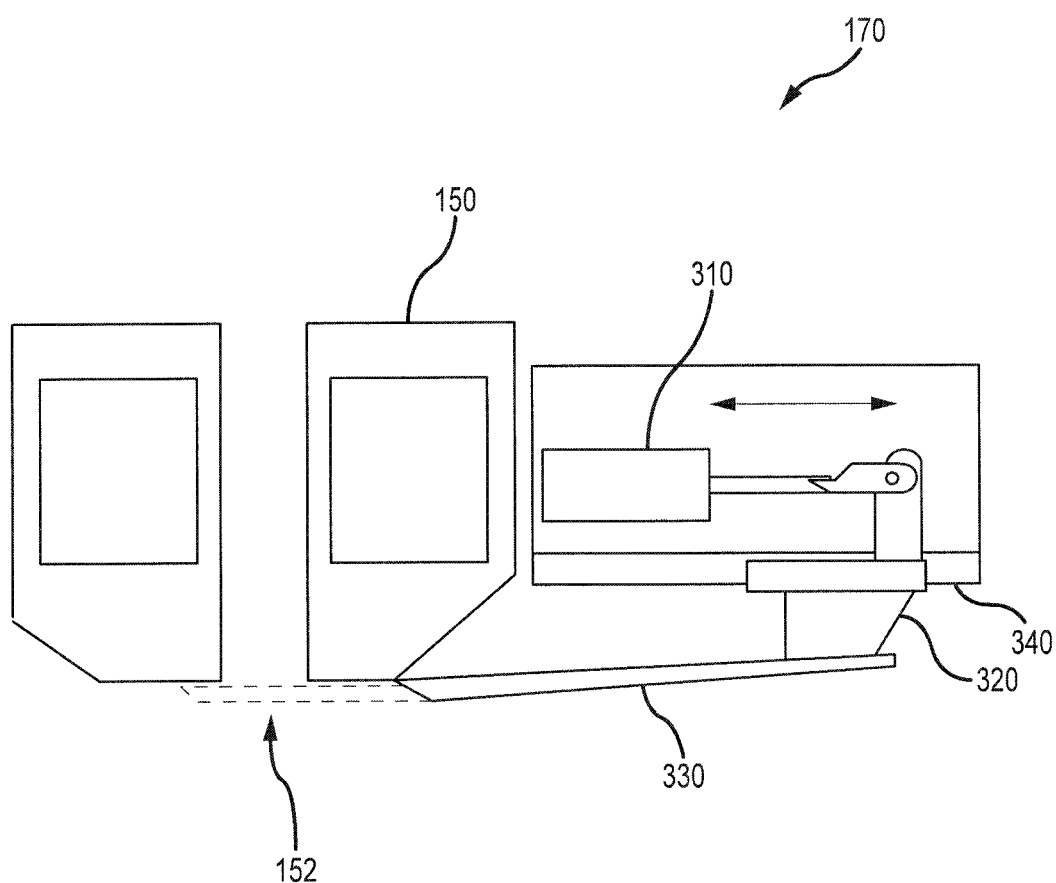
FIG. 3 illustrates a schematic view of a cutter in accordance with various embodiments.

Referring to FIG. 3, a schematic view of a cutter 170 is illustrated according to various embodiments. Cutter may comprise an actuator 310, a blade carriage 320, and a cutting blade 330. Actuator 310 may be coupled to blade carriage 320, and blade carriage 320 may be coupled to cutting blade 330. Blade carriage 320 may ride along a guide rail 340. Cutting blade 330 may comprise any type of blade capable of cutting a co-extruded filament. In various embodiments, cutting blade 330 may comprise at least one of a knife blade, scissors, rotary shear, roller knife, laser heat, rotary saw, linear saw, and an abrasive saw. In response to a command to end a section of a co-extruded filament, actuator 310 may drive cutting blade 330 across channel 152 in nozzle 150. Cutting blade 330 may cut a co-extruded filament that extends from nozzle 150, creating an end to a section of a co-extruded filament.

Figure 4:
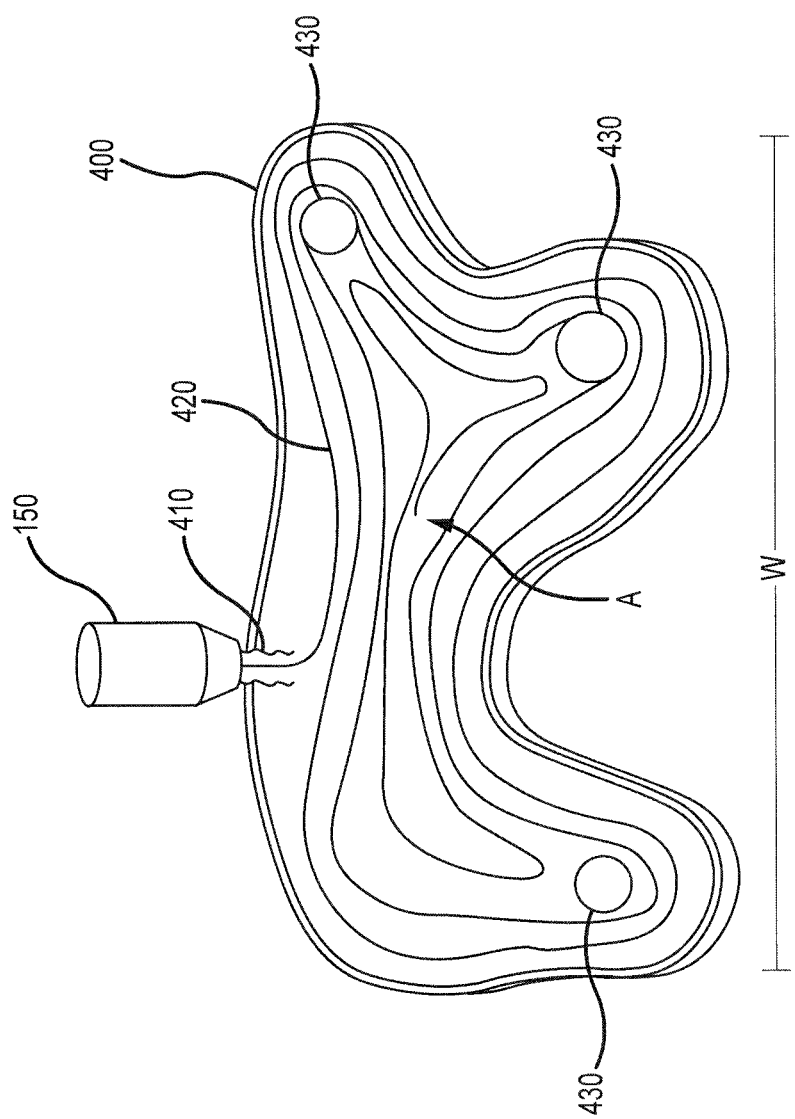
FIG. 4 illustrates a perspective view of a component in the process of being manufactured in accordance with various embodiments.

Referring to FIG. 4, a perspective view of a component 400 in the process of being manufactured is illustrated according to various embodiments. Nozzle 150 is shown depositing a co-extruded filament 410. The path taken by nozzle 150 in depositing co-extruded filament 410 is shown by the shape of fiber filament 420. In creating the illustrated layer of component 400, nozzle 150 began deposition at point A. Component 400 may comprise one continuous co-extruded filament 410 in the illustrated layer, and thus one continuous fiber filament 420 which reinforces component 400 in the layer shown. Nozzle 150 may travel back and forth or around component 400 many times in order to create a single layer of component 400. Thus, in various embodiments, a length of co-extruded filament 410 and fiber filament 420 may be greater than a width W of component 400. In various embodiments, a length of co-extruded filament 410 and fiber filament 420 may be hundreds or thousands of times greater than the width W of component 400.

In various embodiments, component 400 may comprise cooling members 430. In various embodiments cooling members may comprise posts, bushings, cylinders, or other components which conduct heat away from co-extruded filament 410. Cooling members 430 may assist in rapidly cooling co-extruded filament 410.

Figure 5:
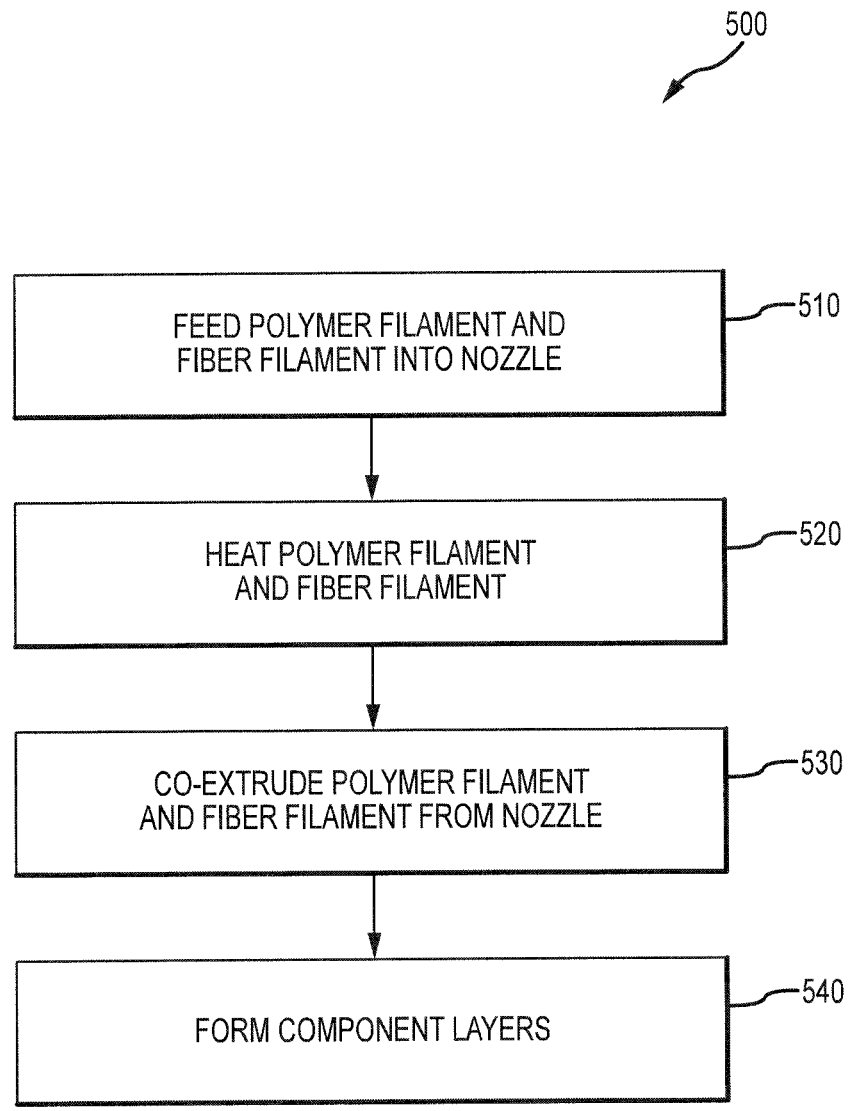
FIG. 5 illustrates a flow diagram of a process for manufacturing a component in accordance with various embodiments.

Referring to FIG. 5, a process 500 for manufacturing a component is illustrated according to various embodiments. The process 500 may include feeding a polymer filament and a fiber filament into a nozzle (step 510). The polymer filament and the fiber filament may be heated (step 520). The heating may at least partially melt the polymer filament, causing the polymer filament to couple to the fiber filament. The method may further include co-extruding the polymer filament and the fiber filament from the nozzle (step 530). In various embodiments, a first layer of the component may be formed from a first co-extruded filament, and a second layer of the component may be formed from a second co-extruded filament (step 540). Any number of co-extruded filaments may be used to manufacture the component.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method of manufacturing a component comprising:
    feeding a polymer filament into a nozzle;
    feeding a fiber filament into the nozzle;
    heating the polymer filament and the fiber filament, wherein the heating couples the polymer filament to the fiber filament;
    co-extruding the polymer filament and the fiber filament; and
    cooling the polymer filament and the fiber filament by conducting heat away from the polymer filament and fiber filament using cooling members.

2. The method of claim 1, further comprising causing the fiber filament to become at least partially encapsulated within the polymer filament.

3. The method of claim 1, further comprising creating a first layer of the component with a first continuous co-extruded filament.

4. The method of claim 3, further comprising cutting the first continuous co-extruded filament.

5. The method of claim 4, further comprising creating a second layer of the component with a second continuous co-extruded filament.

6. The method of claim 1, wherein the polymer filament comprises at least one of polyether ether ketone (PEEK), nylon, and acrylonitrile butadiene styrene (ABS).

7. The method of claim 1, wherein the fiber filament comprises a least one of glass, carbon, and aramid fiber.

8. The method of claim 1, wherein the nozzle follows a path designated by a controller in communication with a non-transitory, tangible memory.

9. The method of claim 1, wherein the component comprises at least one of an aircraft component, engine component, automotive component, sporting good component, consumer product component, tooting component, and assembly aid.

10. The method of claim 1, further comprising co-extruding the polymer filament and the fiber filament into a mold or a free form grown part.

* * * * *